(12) United States Patent
Ye

(10) Patent No.: US 11,503,630 B2
(45) Date of Patent: *Nov. 15, 2022

(54) PROCESSING BUFFER STATUS REPORTS

(71) Applicant: Google LLC, Mountain View, CA (US)

(72) Inventor: Shiang-Rung Ye, New Taipei (TW)

(73) Assignee: Google LLC, Mountain View, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/121,420

(22) Filed: Dec. 14, 2020

(65) Prior Publication Data

US 2021/0100025 A1 Apr. 1, 2021

Related U.S. Application Data

(63) Continuation of application No. 16/281,000, filed on Feb. 20, 2019, now Pat. No. 10,869,334.

(60) Provisional application No. 62/687,122, filed on Jun. 19, 2018.

(51) Int. Cl.
*H04W 72/14* (2009.01)
*H04W 76/11* (2018.01)
*H04W 28/02* (2009.01)
*H04W 80/02* (2009.01)

(52) U.S. Cl.
CPC ....... *H04W 72/14* (2013.01); *H04W 28/0278* (2013.01); *H04W 76/11* (2018.02); *H04W 80/02* (2013.01)

(58) Field of Classification Search
CPC . H04W 76/11; H04W 72/14; H04W 72/0404; H04W 72/0446; H04W 72/042; H04W 80/02; H04W 28/0278; H04L 1/1864; H04L 27/26
See application file for complete search history.

(56) References Cited

U.S. PATENT DOCUMENTS

| 8,340,128 | B2 | 12/2012 | Joo et al. |
| 8,934,502 | B2 | 1/2015 | Chun et al. |
| 9,369,904 | B2 | 6/2016 | Wen et al. |
| 10,869,334 | B2 | 12/2020 | Ye |

(Continued)

FOREIGN PATENT DOCUMENTS

WO 2017074437 5/2017

OTHER PUBLICATIONS

"Evolved Universal Terrestrial Radio Access (E-UTRA); Medium Access Control (MAC) protocol specification", 3GPP TS 36.321 version 15.2.0 Release 15, Jul. 2018, 128 pages.

(Continued)

*Primary Examiner* — Wei Zhao
(74) *Attorney, Agent, or Firm* — Colby Nipper PLLC

(57) ABSTRACT

This document describes processing a buffer status report from a user equipment (UE) by a base station in a radio access network, in which the base station receives a One-Byte-Buffer Status Report for a Logical Channel Group with a highest priority logical channel and data available for transmission by the user equipment, the One-Byte-Buffer Status Report indicating that a number of padding bits in a Media Access Control (MAC) Protocol Data Unit (PDU) is greater than or equal to a size of a subheader of a Short Buffer Status Report (BSR) or greater than or equal to the size of the Short BSR and is also less than the size of the Short BSR plus the subheader of the Short BSR.

20 Claims, 6 Drawing Sheets

(56) References Cited

U.S. PATENT DOCUMENTS

| | | |
|---|---|---|
| 10,945,154 B2 * | 3/2021 | Yi ..................... H04W 28/0278 |
| 2013/0028223 A1 * | 1/2013 | Kim ..................... H04L 5/0091 |
| | | 370/329 |
| 2015/0257173 A1 | 9/2015 | You et al. |
| 2017/0353819 A1 * | 12/2017 | Yin ................... H04W 72/1284 |
| 2018/0270698 A1 | 9/2018 | Babaei et al. |
| 2019/0387540 A1 | 12/2019 | Ye |

OTHER PUBLICATIONS

"Medium Access Control (MAC) Protocol Specification", 3GPP TS 38.321 version 15.2.0 Release 15, Jan. 16, 19, 74 pages.
"Non-Final Office Action", U.S. Appl. No. 16/281,000, 10 Pages.
"Notice of Allowance", U.S. Appl. No. 16/281,000, filed Aug. 18, 2020, 11 Pages.

* cited by examiner

PROCESSING BUFFER STATUS REPORTS

RELATED APPLICATION

This application is a continuation of and claims the benefit of U.S. Utility application Ser. No. 16/281,000 filed Feb. 20, 2019, which in turn claims priority under 35 U.S.C. § 119(e) to U.S. Provisional Patent Application 62/687,122, filed on Jun. 19, 2018, which are hereby incorporated by reference in their entireties.

BACKGROUND

In Long Term Evolution (LTE) and Fifth Generation New Radio (5G NR) wireless communication systems, buffer status of pending data to be transmitted by a user equipment (UE) is communicated to a base station to enable the base station to schedule resources for the user equipment to transmit the data. The status of the buffer is communicated in a buffer status report (BSR) by the Media Access Control (MAC) layer of a network stack in the user equipment. If there are padding bits in a MAC Protocol Data Unit (PDU), the padding bits are used for the BSR, which is called a padding BSR. The padding BSR includes a subheader and a BSR MAC control element (CE). The minimum size of the subheader is one byte and the minimum size of the BSR CE, which is called a Short BSR, is also one byte. Existing techniques use two padding bytes to report the padding BSR, leading to an inefficient use of network resources. By way of background, buffer status reporting is specified in 3GPP TS 36.321 V15.4.0 and 3GPP TS 38.321 V15.4.0.

SUMMARY

This summary is provided to introduce simplified concepts of reporting buffer status in wireless communication systems. The simplified concepts are further described below in the Detailed Description. This summary is not intended to identify essential features of the claimed subject matter, nor is it intended for use in determining the scope of the claimed subject matter.

In aspects, reporting a buffer status by a user equipment in a wireless communication network is described, in which the user equipment receives a mapping between a first logical channel and a first value and receives an uplink grant to transmit a Media Access Control (MAC) Protocol Data Unit (PDU). If the user equipment determines that a number of remaining bits in the MAC PDU is less than a size of a Short Buffer Status Report (BSR) Control Element (CE) plus a subheader of the BSR CE and is also greater than or equal to the size of the subheader of the Short BSR CE or greater than or equal to the size of the Short BSR CE, the user equipment includes an X-Byte-BSR in the MAC PDU. If the user equipment determines that the first logical channel has data pending for transmission and that the first logical channel has a highest priority of logical channels that have data pending for transmission, the user equipment sets a first subfield of a Logical Channel Identifier (LCID) to the first value, sets a second subfield of the LCID field in the first subheader to a second value that is associated with the first value, and transmits the MAC PDU.

In another aspect, a user equipment (UE) is described that includes a radio frequency (RF) transmitter and a processor and memory system coupled to the RF transmitter and includes instructions that are executable to determine if a number of padding bits in a Media Access Control (MAC) Protocol Data Unit (PDU) is greater than or equal to a size of a subheader of a Short Buffer Status Report (BSR) and is also less than the size of the Short BSR plus the subheader of the Short BSR. The instructions are further executable to, based on the determination that the number of padding bits in the MAC PDU is greater than or equal to the size of the subheader of the Short BSR and is also less than the size of the Short BSR plus the subheader of the Short BSR, transmit, using the RF transmitter, a One-Byte-BSR for a Logical Channel Group with a highest priority logical channel and data available for transmission to a base station.

BRIEF DESCRIPTION OF THE DRAWINGS

Aspects of reporting buffer status in wireless communication systems are described with reference to the following drawings. The same numbers are used throughout the drawings to reference like features and components.

DETAILED DESCRIPTION

This document describes reporting a buffer status by a user equipment (UE) to a base station in a wireless communication network, in which the user equipment determines if a number of remaining bits in a Media Access Control (MAC) Protocol Data Unit (PDU) can be included in a Buffer Status Report (BSR), if a first logical channel has data pending for transmission, and that the first logical channel has a highest priority of logical channels that have data pending for transmission. The user equipment sets a first subfield of a Logical Channel Identifier (LCID) to the first value, sets a second subfield of the LCID field in the first subheader to a second value that is associated with the first value, and transmits the MAC PDU to the base station.

If the data to be transmitted in a MAC Protocol Data Unit (PDU) requires padding to increase the length of the data to end on a byte boundary in the MAC PDU, padding is applied to the data. Padding may be applied at the end of the MAC PDU or in a padding BSR. The padding BSR includes a subheader and a BSR MAC control element (CE). The minimum size of the subheader is one byte and the minimum size of the BSR CE, which is called Short BSR, is also one byte. Existing techniques use two padding bytes to report the padding BSR, leading to an inefficient use of network resources. In aspects, when there is only one padding byte, the one byte is used to report the BSR.

Example Environment

Figure 1:
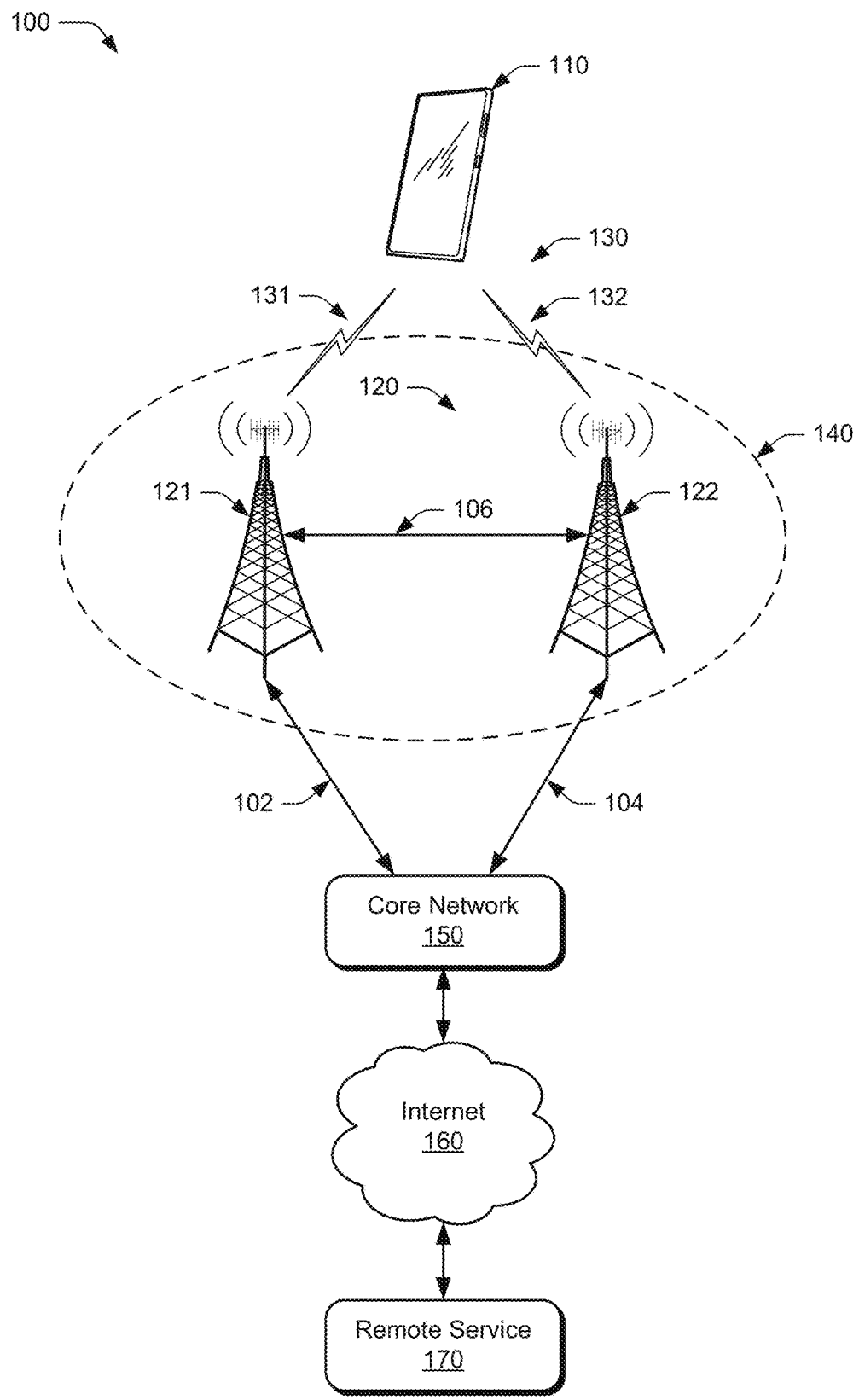
FIG. 1 illustrates an example wireless network environment in which various aspects of reporting buffer status in wireless communication systems can be implemented.

FIG. 1 illustrates an example environment 100 which includes a user equipment 110 (UE 110) that can communicate with base stations 120 (illustrated as base stations 121 and 122) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
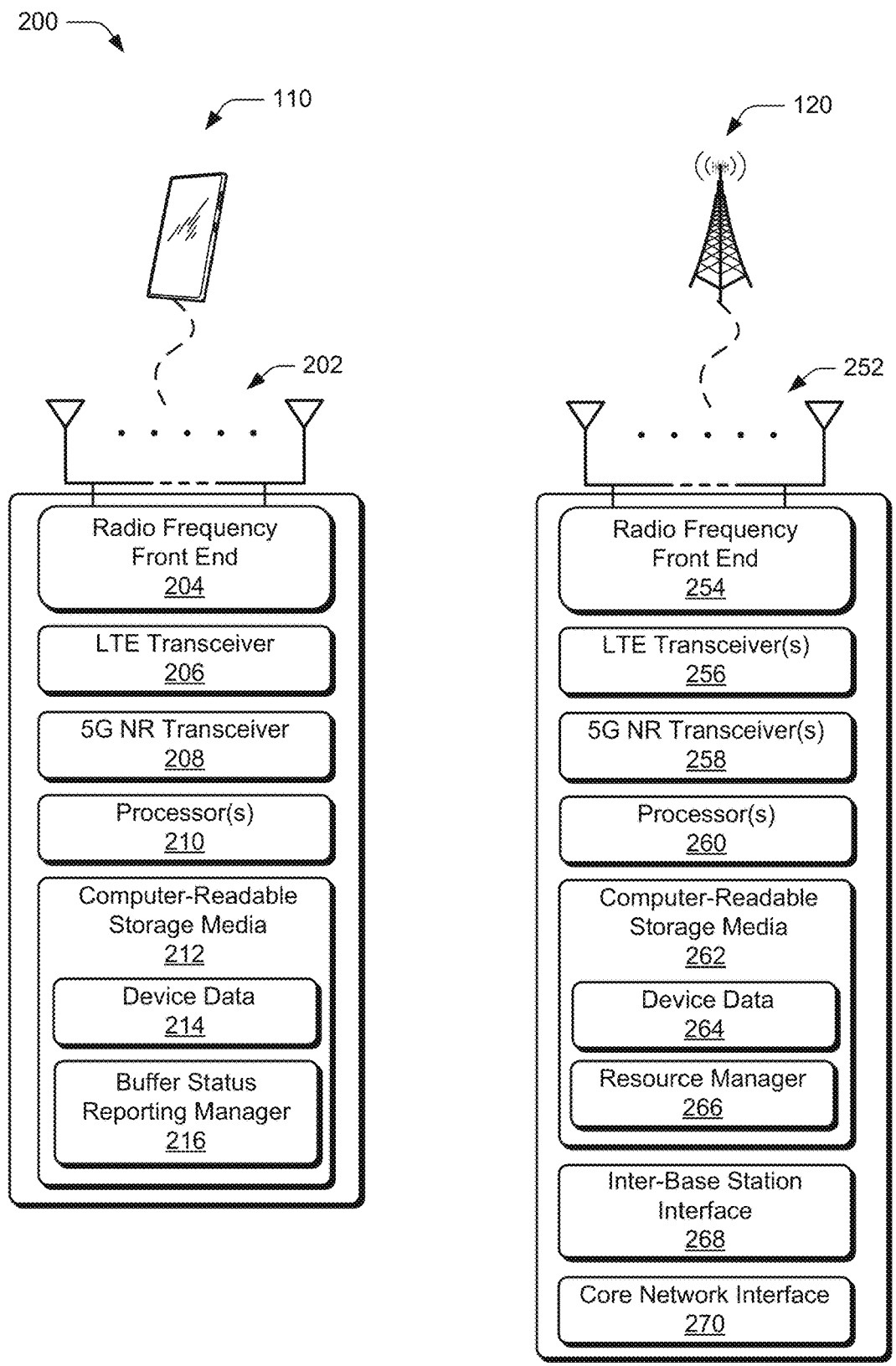
FIG. 2 illustrates an example device diagram that can implement various aspects of reporting buffer status in wireless communication systems.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

In some implementations, the CRM 212 may also include a buffer status reporting manager 216. The buffer status reporting manager 216 can communicate with the antennas 202, the RF front end 204, the LTE transceiver 206, and/or the 5G NR transceiver 208 to monitor the quality of the wireless communication links 130 and initiate a beam search based on the monitored quality of the wireless communication links 130.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the user equipment 110.

CRM 262 also includes a resource manager 266. Alternately or additionally, the resource manager 266 may be implemented in whole or part as hardware logic or circuitry integrated with or separate from other components of the base stations 120. In at least some aspects, the resource manager 266 configures the LTE transceivers 256 and the 5G NR transceivers 258 for communication with the user equipment 110, as well as communication with a core network, such as the core network 150. Additionally, the resource manager 266 may negotiate with the user equipment 110 to determine resources for use by the UE 110 for a user equipment-initiated beam search.

The base stations 120 include an inter-base station interface 268, such as an Xn and/or X2 interface, which the resource manager 266 configures to exchange user-plane and control-plane data between other base stations 120, to manage the communication of the base stations 120 with the user equipment 110. The base stations 120 include a core network interface 270 that the resource manager 266 configures to exchange user-plane and control-plane data with core network functions and/or entities.

User Plane and Control Plane Signaling

Figure 3:
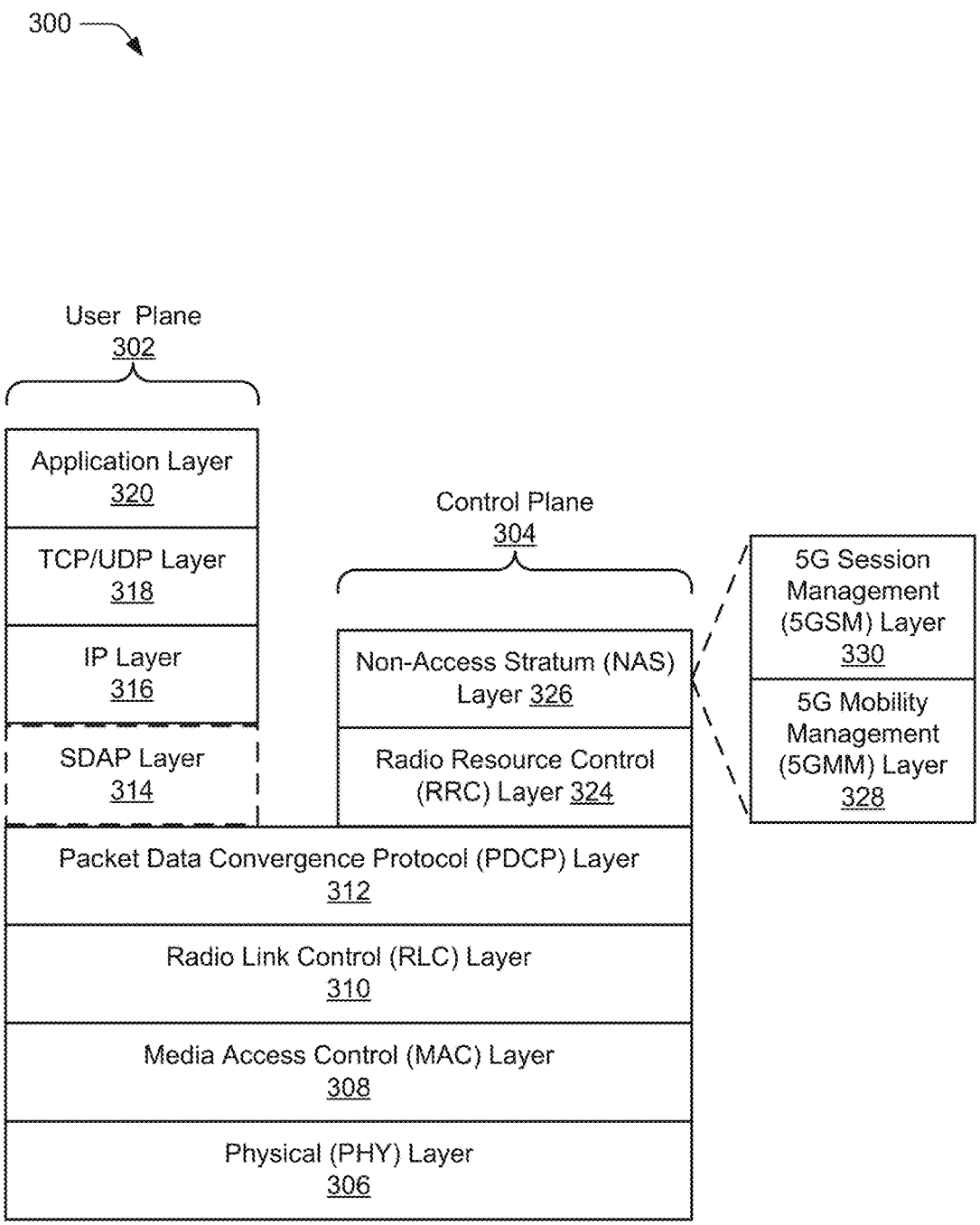
FIG. 3 illustrates an example block diagram of a network stack model with which various aspects of reporting buffer status in wireless communication systems techniques can be implemented.

FIG. 3 illustrates an example block diagram 300 of a wireless network stack model 300 (stack 300). The stack 300 characterizes a communication system for the example environment 100, in which various aspects of reporting buffer status in wireless communication systems can be implemented. The stack 300 includes a user plane 302 and a control plane 304. Upper layers of the user plane 302 and the control plane 304 share common lower layers in the stack 300. Wireless devices, such as the UE 110 or the base stations 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management in 5G networks (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as an Access and Mobility Management Function in a 5G core network or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

Figure 4:
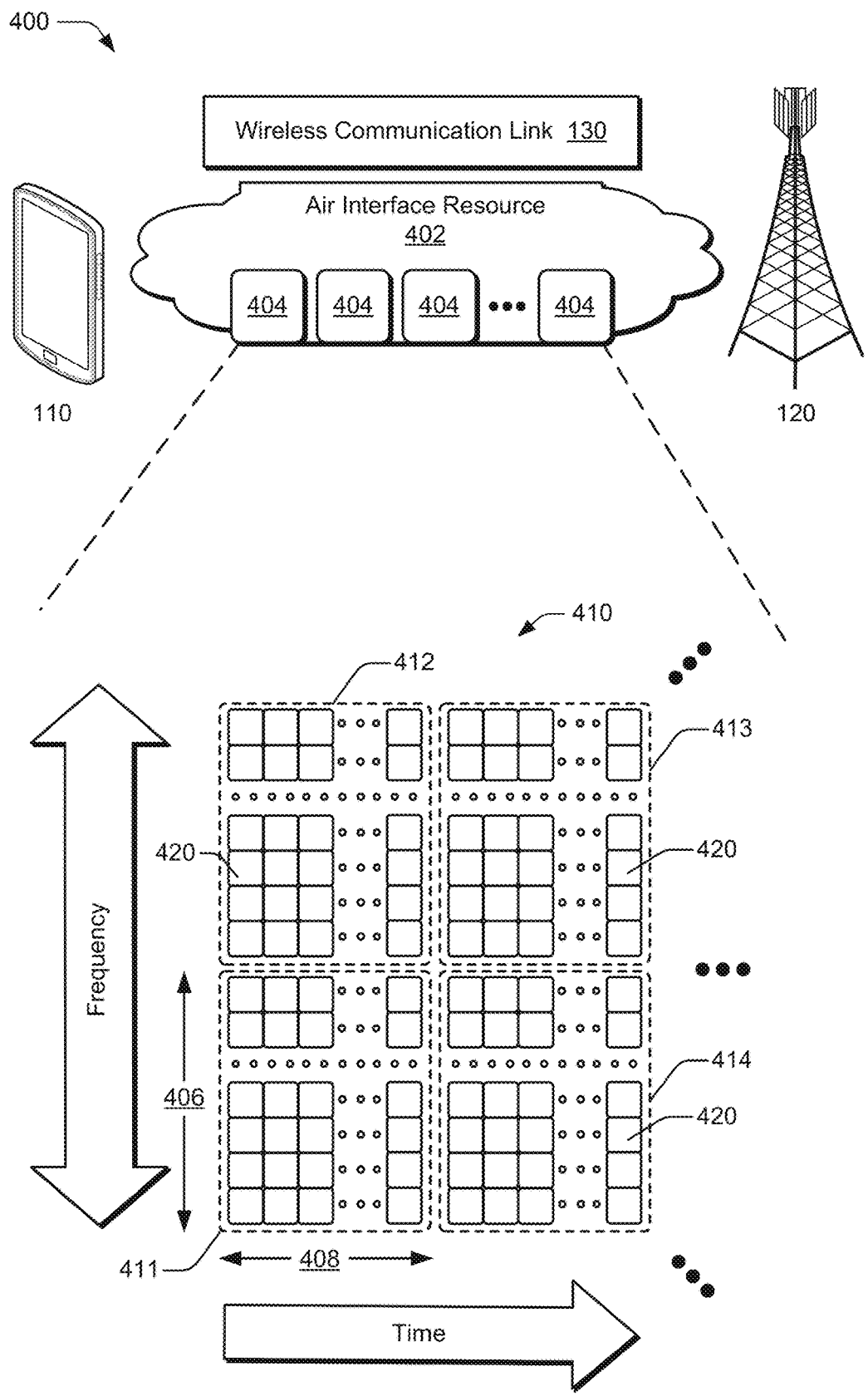
FIG. 4 illustrates an air interface resource that extends between a user equipment and a base station and with which various aspects of reporting buffer status in wireless communication systems techniques can be implemented.

FIG. 4 illustrates an air interface resource that extends between a user equipment and a base station and with which various aspects of reporting buffer status in wireless communication systems can be implemented. The air interface resource 402 can be divided into resource units 404, each of which occupies some intersection of frequency spectrum and elapsed time. A portion of the air interface resource 402 is illustrated graphically in a grid or matrix having multiple resource blocks 410, including resource blocks 411, 412, 412, 414. An example of a resource unit 404 therefore includes at least one resource block 410. As shown, time is depicted along the horizontal dimension as the abscissa axis, and frequency is depicted along the vertical dimension as the ordinate axis. The air interface resource 402, as defined by a given communication protocol or standard, may span any suitable specified frequency range and/or may be divided into intervals of any specified duration. Increments of time can correspond to, for example, milliseconds (mSec). Increments of frequency can correspond to, for example, megahertz (MHz).

In example operations generally, the base station 120 allocates portions (e.g., resource units 404) of the air interface resource 402 for uplink and downlink communications. Each resource block 410 of network access resources may be allocated to support respective wireless communication link 130 of multiple user equipment 110. In the lower left corner of the grid, the resource block 411 may span, as defined by a given communication protocol, a specified frequency range 406 and comprise multiple subcarriers or frequency sub-bands. The resource block 411 may include any suitable number of subcarriers (e.g., 12) that each correspond to a respective portion (e.g., 15 kHz) of the specified frequency range 406 (e.g., 180 kHz). The resource block 411 may also span, as defined by the given communication protocol, a specified time interval 408 or time slot (e.g., lasting approximately one-half millisecond or 7 orthogonal frequency-division multiplexing (OFDM) symbols). The time interval 408 includes subintervals that may each correspond to a symbol, such as an OFDM symbol. As shown in FIG. 4, each resource block 410 may include multiple resource elements 420 (REs) that correspond to, or are defined by, a subcarrier of the frequency range 406 and a subinterval (or symbol) of the time interval 408. Alternatively, a given resource element 420 may span more than one frequency subcarrier or symbol. Thus, a resource unit 404 may include at least one resource block 410, at least one resource element 420, and so forth.

In example implementations, multiple user equipment 110 (one of which is shown) are communicating with the base station 120 through access provided by portions of the air interface resource 402. The resource manager 266 (not shown in FIG. 4) may determine a respective type or amount of information (e.g., data or control information) to be communicated (e.g., transmitted) by the user equipment 110. For example, the resource manager 266 can determine that each user equipment 110 is to transmit a different respective amount of information. The resource manager 266 then allocates one or more resource blocks 410 to each user equipment 110 based on the determined amount of information.

Additionally or in the alternative to block-level resource grants, the resource manager 266 may allocate resource units at an element-level. Thus, the resource manager 266 may allocate one or more resource elements 420 or individual subcarriers to different UEs 110. By so doing, one resource block 410 can be allocated to facilitate network access for multiple user equipment 110. Accordingly, the resource manager 266 may allocate, at various granularities, one or up to all subcarriers or resource elements 420 of a resource block 410 to one user equipment 110 or divided across multiple user equipment 110, thereby enabling higher network utilization or increased spectrum efficiency.

The resource manager 266 can therefore allocate air interface resource 402 by resource unit 404, resource block 410, frequency carrier, time interval, resource element 420, frequency subcarrier, time subinterval, symbol, spreading code, some combination thereof, and so forth. Based on respective allocations of resource units 404, the resource manager can transmit respective messages to the multiple user equipment 110 indicating the respective allocation of resource units 404 to each user equipment 110. Each message may enable a respective user equipment 110 to queue the information or configure the LTE transceiver 206, the 5G NR transceiver 208, or both to communicate via the allocated resource units 404 of the air interface resource 402.

Buffer Status Reporting

The user equipment 110 uses a buffer status reporting procedure to communicate information to the base station 121 about the amount of data in uplink buffers of the MAC layer 308 of the user equipment 110 that is pending for transmission to the base station 121. The buffer status report enables the base station 121 to schedule air interface resources 402 over which the user equipment 110 can transmit the uplink data from the uplink buffers in the MAC layer 308. The uplink data may be associated with a single logical channel or one of a number of logical channels in a logical channel group (LCG) (e.g., logicalChannelGroup). Each logical channel may have an associated priority. The user equipment 110 can select which uplink data to transmit, or the order of the uplink data to transmit based on the priority associated with a logical channel. For example, the user equipment 110 can select to transmit the buffered data of the logical channel with the highest priority to the base station 121 before transmitting other buffered uplink data.

The Radio Resource Control (RRC) layer 324 protocol controls BSR reporting by configuring three timers: a periodicBSR-Timer, a retxBSR-Timer, and a logicalChannelSR-ProhibitTimer. Optionally, for each logical channel, the RRC protocol, may signal a logicalChannelGroup to allocate a logical channel to an LCG.

If the data to be transmitted in a MAC Protocol Data Unit (PDU) requires padding to increase the length of the data to end on a byte boundary in the MAC PDU, padding is applied to the data. Padding may be applied at the end of the MAC PDU or in a padding BSR. The padding BSR includes a subheader and a BSR MAC control element (CE). The minimum size of the subheader is one byte and the minimum size of the BSR CE, which is called a Short BSR, is also one byte.

In aspects, when there is only one padding byte to be sent for a MAC PDU, the one byte of padding is used to report the BSR. For example, the MAC layer 308 in the user equipment 110 determines if a number of remaining bits in a first MAC PDU is smaller than a size of a Short Buffer Status Report CE plus a subheader of the BSR CE and is also greater than or equal to the subheader of the Short BSR CE or greater than or equal to the size of the Short BSR CE. In the case that this condition is TRUE, the user equipment 110 reports a One-Byte-BSR for the uplink buffer of the logical channel group that includes the highest priority logical channel with data pending for transmission to the base station 121. In the case that this condition is FALSE, the user equipment 110 applies other conditional tests used in conventional BSR techniques to determine which type of BSR to send, as described in further detail below with respect to FIG. 5.

By way of reference the periodicBSR-Timer, the retxBSR-Timer, the logicalChannelSR-ProhibitTime, and the logicalChannelGroup are defined in 3GPP TS 36.331 section 6.3.2. The periodicBSR-Timer, the retxBSR-Timer, and the logicalChannelGroup are defined in 3GPP TS 38.331 section 6.3.2. Although the Detailed Description references specific standard specifications, future standards using the specified information elements, messages, or technical features are also encompassed.

Example Methods

Example methods 500 and 600 are described with reference to FIGS. 5 and 6 in accordance with one or more aspects of reporting buffer status in wireless communication systems. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
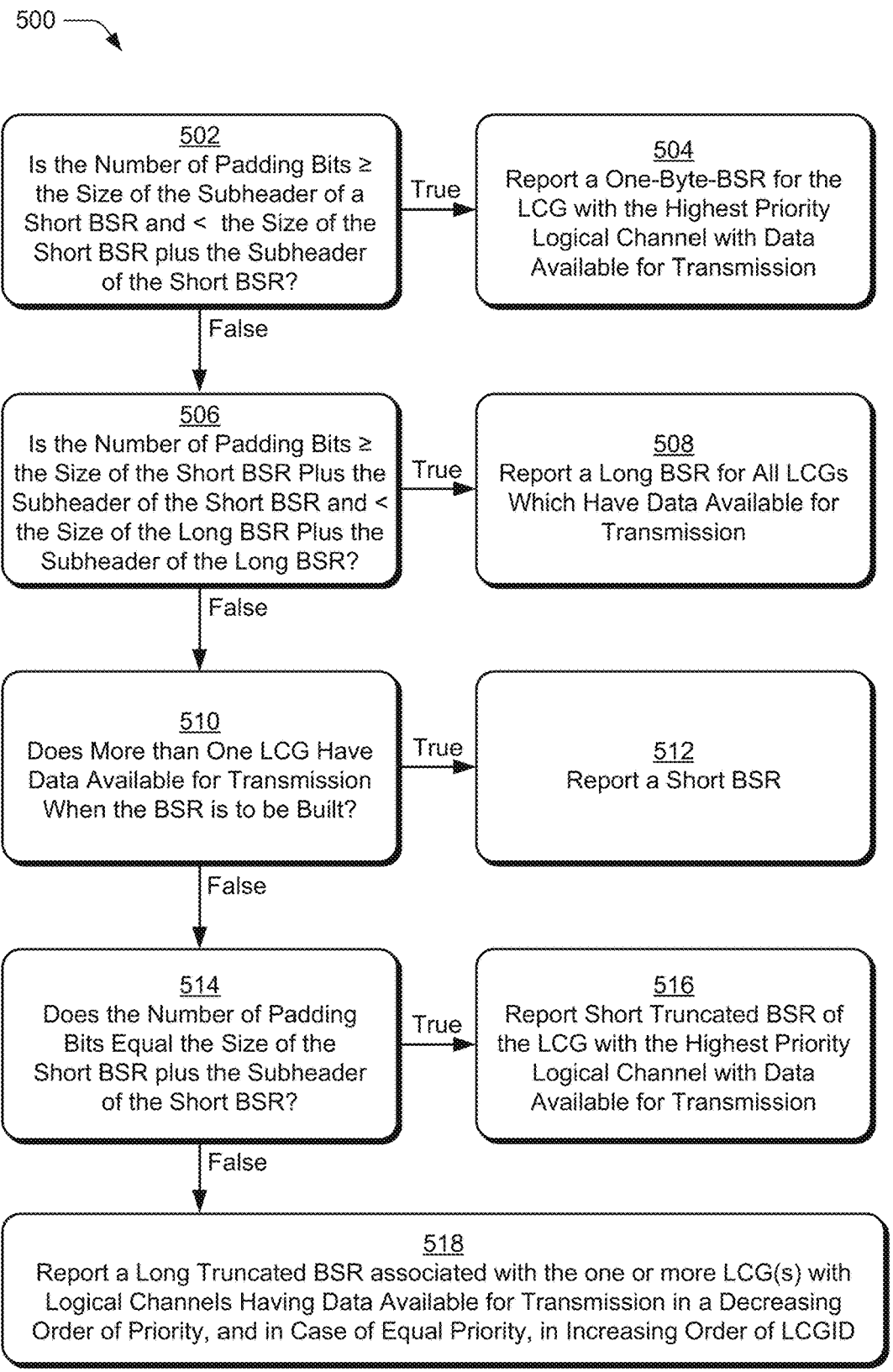
FIG. 5 illustrates an example method of reporting buffer status in wireless communication systems in accordance with aspects of the techniques described herein.

FIG. 5 illustrates example method(s) 500 of reporting buffer status in wireless communication systems as generally related to the user equipment 110. At block 502, a user equipment determines if a number of padding bits is greater than or equal to the size of a subheader of a Short BSR and is also less than the size of the Short BSR plus the subheader of the Short BSR. For example, the MAC layer 308 of the user equipment 110 determines if a number of padding bits is greater than or equal to the size of a subheader of a Short BSR and is also less than the size of the Short BSR plus the subheader of the Short BSR.

At block 504, if the determination in 502 is TRUE, the user equipment reports a One-Byte-BSR for a Logical Channel Group with the highest priority logical channel with data available for transmission to the base station. For example, the MAC layer 308 of the user equipment 110 reports a One-Byte-BSR for a Logical Channel Group with the highest priority logical channel with data available for transmission to the base station 121.

At block 506, if the determination in 502 is FALSE, the user equipment determines if the number of padding bits is greater than or equal to the size of the Short BSR plus the subheader of the Short BSR and is also less than the size of a Long BSR plus the subheader of the Long BSR. For example, the MAC layer 308 of the user equipment 110 determines if the number of padding bits is greater than or equal to the size of the Short BSR plus the subheader of the Short BSR and is also less than the size of a Long BSR plus the subheader of the Long BSR.

At block 508, if the determination in 506 is TRUE, the user equipment reports a Long BSR for all LCGs, which have data available for transmission to the base station. For example, the MAC layer 308 of the user equipment 110 reports a Long BSR for all LCGs, which have data available for transmission to the base station 121.

At block 510, if the determination in 506 is FALSE, the user equipment determines if more than one LCG has data available for transmission when the BSR is to be built. For example, the MAC layer 308 of the user equipment 110 determines if more than one LCG has data available for transmission when the MAC layer 308 is building the BSR.

At block 512, if the determination in 510 is TRUE, the user equipment reports a Short BSR. For example, the MAC layer 308 of the user equipment 110 reports a Short BSR to the base station 121.

At block 514, if the determination in 510 is FALSE, the user equipment determines if the number of padding bits equals the size of the Short BSR plus the subheader of the Short BSR. For example, the MAC layer 308 of the user equipment 110 determines if the number of padding bits equals the size of the Short BSR plus the subheader of the Short BSR.

At block 516, if the determination in 514 is TRUE, the user equipment reports a Short Truncated BSR associated with the Logical Channel Group that includes the highest priority logical channel with data available for transmission. For example, the MAC layer 308 of the user equipment 110 reports a Short Truncated BSR for the Logical Channel Group that includes the highest priority logical channel with uplink data available for transmission to the base station 121.

At block 518, if the determination in 514 is FALSE, the user equipment reports a Long Truncated BSR associated with the one or more Logical Channels that have data available for transmission in decreasing order of priority and in the case of equal priority in increasing order of LCG identifier (LCGID). For example, the MAC layer 308 of the user equipment 110 reports a Long Truncated BSR associated with one or more Logical Channels that have data available for transmission in decreasing order of priority, and in the case of equal priority, in increasing order of LCGID to the base station 121.

Figure 6:
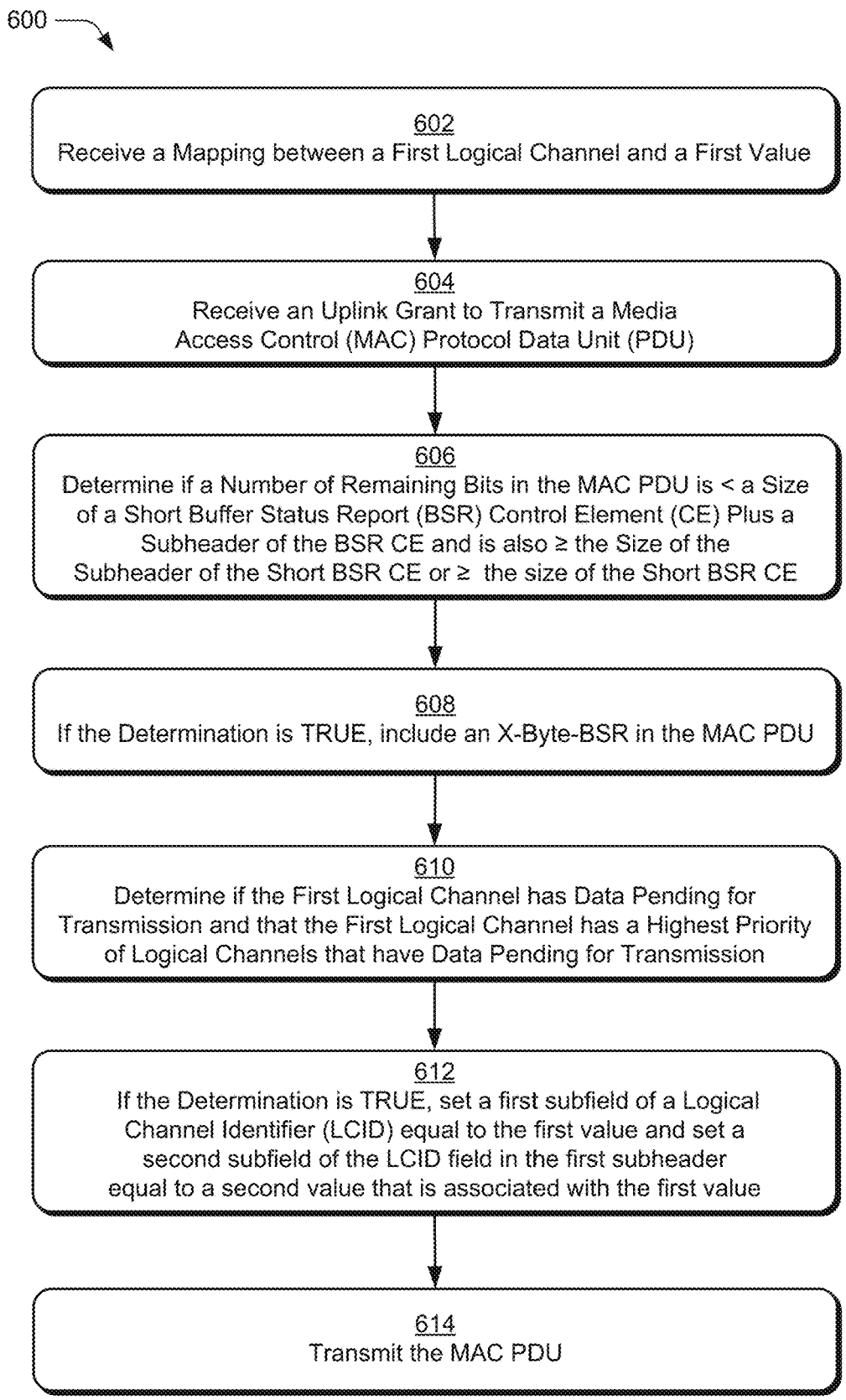
FIG. 6 illustrates an example method of reporting buffer status in wireless communication systems in accordance with aspects of the techniques described herein.

FIG. 6 illustrates example method(s) 600 of reporting buffer status in wireless communication systems as generally related to the user equipment 110. At block 602, a user equipment receives a mapping between a first logical channel and a first value. For example, the user equipment 110 receives a mapping between a first logical channel and a first value from the base station 121.

At block 604, the user equipment receives an uplink grant to transmit a Media Access Control (MAC) Protocol Data Unit (PDU). For example, the user equipment 110 receives an uplink grant to transmit a Media Access Control (MAC) Protocol Data Unit (PDU) from the base station 121.

At block 606, the user equipment determines if a number of remaining bits in the MAC PDU is less than a size of a Short Buffer Status Report (BSR) Control Element (CE) plus a subheader of the BSR CE and is also greater than or equal to the subheader of the Short BSR CE or greater than or equal to the size of the Short BSR CE. For example, the user equipment 110 determines if a number of remaining bits in the MAC PDU is less than a size of a Short BSR CE plus a subheader of the BSR CE and is also greater than or equal to the subheader of the BSR CE.

At block 608, if the determination in 606 is TRUE, the user equipment includes an X-Byte-BSR in the MAC PDU. For example, the MAC layer 308 of the user equipment 110 includes an X-Byte-BSR in the MAC PDU.

At block 610, the user equipment determines if the first logical channel has data pending for transmission and that the first logical channel has a highest priority of logical channels that have data pending for transmission. For example, the MAC layer 308 of the user equipment 110 determines if the first logical channel has data pending for transmission and that the first logical channel has a highest priority of logical channels that have data pending for transmission.

At block 612, if the determination in 610 is TRUE, the user equipment sets a first subfield of a Logical Channel Identifier (LCID) equal to the first value and sets a second subfield of the LCID field in the first subheader equal to a second value that is associated with the first value. For example, the MAC layer 308 of the user equipment 110 sets a first subfield of an LCID equal to the first value and sets a second subfield of the LCID field in the first subheader equal to a second value that is associated with the first value. The second value of the second subfield may indicate a sum of the data pending or may indicate a level that is indicative of the sum of the data pending in a buffer for transmission from the first logical channel or the logical channel group associated with the first value. Alternatively, the second subfield may indicate that there is no data in the buffer for transmission.

At block 614, the user equipment transmits the MAC PDU. For example, the user equipment 110 transmits the MAC PDU to the base station 121.

Although aspects of reporting buffer status in wireless communication systems have been described in language specific to features and/or methods, the subject of the appended claims is not necessarily limited to the specific features or methods described. Rather, the specific features and methods are disclosed as example implementations of reporting buffer status in wireless communication systems, and other equivalent features and methods are intended to be within the scope of the appended claims. Further, various different aspects are described, and it is to be appreciated that each described aspect can be implemented independently or in connection with one or more other described aspects.

What is claimed is:

1. A base station comprising:
  a radio frequency (RF) receiver; and
  a processor and memory system coupled to the RF receiver and comprising instructions that are executable to:
    transmit, to a user equipment (UE), an uplink grant to transmit a Media Access Control (MAC) Protocol Data Unit (PDU); and
    receive, using the RF receiver, a One-Byte-Buffer Status Report for a Logical Channel Group with a highest priority logical channel and data available for transmission by the UE, the One-Byte-Buffer Status Report consists of a number of padding bits in the MAC PDU that (i) is greater than or equal to a size of a subheader of a Short Buffer Status Report (BSR) or greater than or equal to the size of the Short BSR and (ii) is also less than the size of the Short BSR plus the subheader of the Short BSR.

2. The base station of claim 1, further comprising:
  an RF transmitter; and
  wherein the instructions are further executable to:
    transmit a mapping between a first logical channel and a first value;
    and
    receive the MAC PDU from the UE.

3. The base station of claim 2, wherein a first subfield of a buffer status report (BSR) includes the first value, and wherein a second subfield of the BSR is set to a second value that is associated with the first value, and wherein the included first value, the included second value, and a mapping between the first logical channel and the first value indicate that the first logical channel has data pending for transmission and that the first logical channel has the highest priority of the logical channels that have data pending for transmission by the UE.

4. The base station of claim 3, wherein the first value of the first subfield is associated with a first logical channel or associated with the logical channel group (LCG) including the first logical channel, and wherein the second value of the second subfield is used to indicate a sum of data or a level indicative of the sum of data pending in a buffer for transmission by the UE from the first logical channel or the logical channel group associated with the first value.

5. The base station of claim 2, wherein the reception of the MAC PDU is effective to direct the base station to allocate radio resources for the user equipment based on the first value.

6. The base station of claim 2, wherein the instructions to transmit the mapping between the first logical channel and the first value are further executable to:
  transmit a message to the UE indicating (a) a mapping between the first logical channel and a first logical channel group and (b) a mapping between the first logical channel group and the first value.

7. A method of processing a buffer status from a user equipment (UE) by a base station in a wireless communication network, the method comprising:
  transmitting, by the base station, a mapping between a first logical channel and a first value;
  transmitting an uplink grant to transmit a Media Access Control (MAC) Protocol Data Unit (PDU);
  receiving a MAC PDU from the user equipment, the MAC PDU including an X-Byte-Buffer Status Report (X-Byte-BSR), the X-Byte-BSR consists of a number of remaining bits in the MAC PDU is less than the size of a Short Buffer Status Report (BSR) Control Element (CE) plus a subheader of the BSR CE and is also greater than or equal to the subheader of the Short BSR CE or greater than or equal to the size of the Short BSR CE; and
  wherein a first subfield of the X-Byte-BSR is set to the first value, a second subfield of the X-Byte-BSR is set to a second value that is associated with the first value, and wherein the first value and the second value indicate that the first logical channel has data pending for transmission and that the first logical channel has a highest priority of the logical channels that have data pending for reception from the UE.

8. The method of claim 7, wherein the first value is associated with the first logical channel or associated with a logical channel group (LCG) including the first logical channel.

9. The method of claim 7, wherein the second value indicates a sum of data or a level indicative of the sum of data pending in a buffer for transmission by the UE using the first logical channel or a logical channel group associated with the first value.

10. The method of claim 7, wherein the receiving the MAC PDU comprises:
  allocating radio resources for the user equipment based on the first value.

11. The method of claim 7, wherein the X-Byte-BSR includes a third subfield, and wherein the third subfield of the X-Byte-BSR is set to a third value that indicates that there are one or more other logical channels that have data pending for transmission by the UE.

12. The method of claim 7, wherein the transmitting the MAC PDU is effective to cause the base station to determine whether to allocate radio resources to the user equipment.

13. The method of claim 7, wherein the X-Byte-BSR is the Short BSR CE.

14. The method of claim 13, wherein the first subfield is a Logical Channel Group (LCG) identifier (ID) in the Short BSR CE.

15. The method of claim 13, wherein the second subfield is a buffer size field in the Short BSR CE.

16. The method of claim 7, wherein the X-Byte-BSR is the subheader of a Short BSR CE or a Short Truncated BSR CE.

17. The method of claim 16, wherein the second subfield is a Logical Channel Identifier (LCID) field in the X-Byte-BSR.

18. The method of claim 7, further comprising:
transmitting a message to configure the user equipment with a logical channel and a priority of the logical channel.

19. The method of claim 7, wherein if there are N padding byte(s) and a MAC subheader that is used to indicate padding contains a value that is also N byte(s), the X-Byte-BSR is included in the MAC PDU, instead of the MAC subheader that is used to indicate the padding.

20. A method of reporting a buffer status to a base station by a user equipment (UE) in a wireless communication network, the method comprising:
receiving, by the user equipment, a mapping between a first logical channel and a first value;
receiving an uplink grant to transmit a Media Access Control (MAC) Protocol Data Unit (PDU);
determining if a number of remaining bits in the MAC PDU is less than a size of a Short Buffer Status Report (BSR) Control Element (CE) plus a subheader of a BSR CE and is also greater than or equal to the size of the subheader of the Short BSR CE or greater than or equal to the size of the Short BSR CE; and
based on determining that the number of remaining bits in the MAC PDU is less than the size of the Short Buffer Status Report (BSR) Control Element (CE) plus the subheader of the BSR CE and is also greater than or equal to the subheader of the Short BSR CE or greater than or equal to the size of the Short BSR CE, including an X-Byte-BSR in the MAC PDU.

* * * * *